April 25, 1961     J. W. HICKS, JR     2,980,957
METHOD AND APPARATUS FOR USE IN THE FABRICATION
OF LIGHT-CONDUCTING DEVICES
Filed Aug. 11, 1958
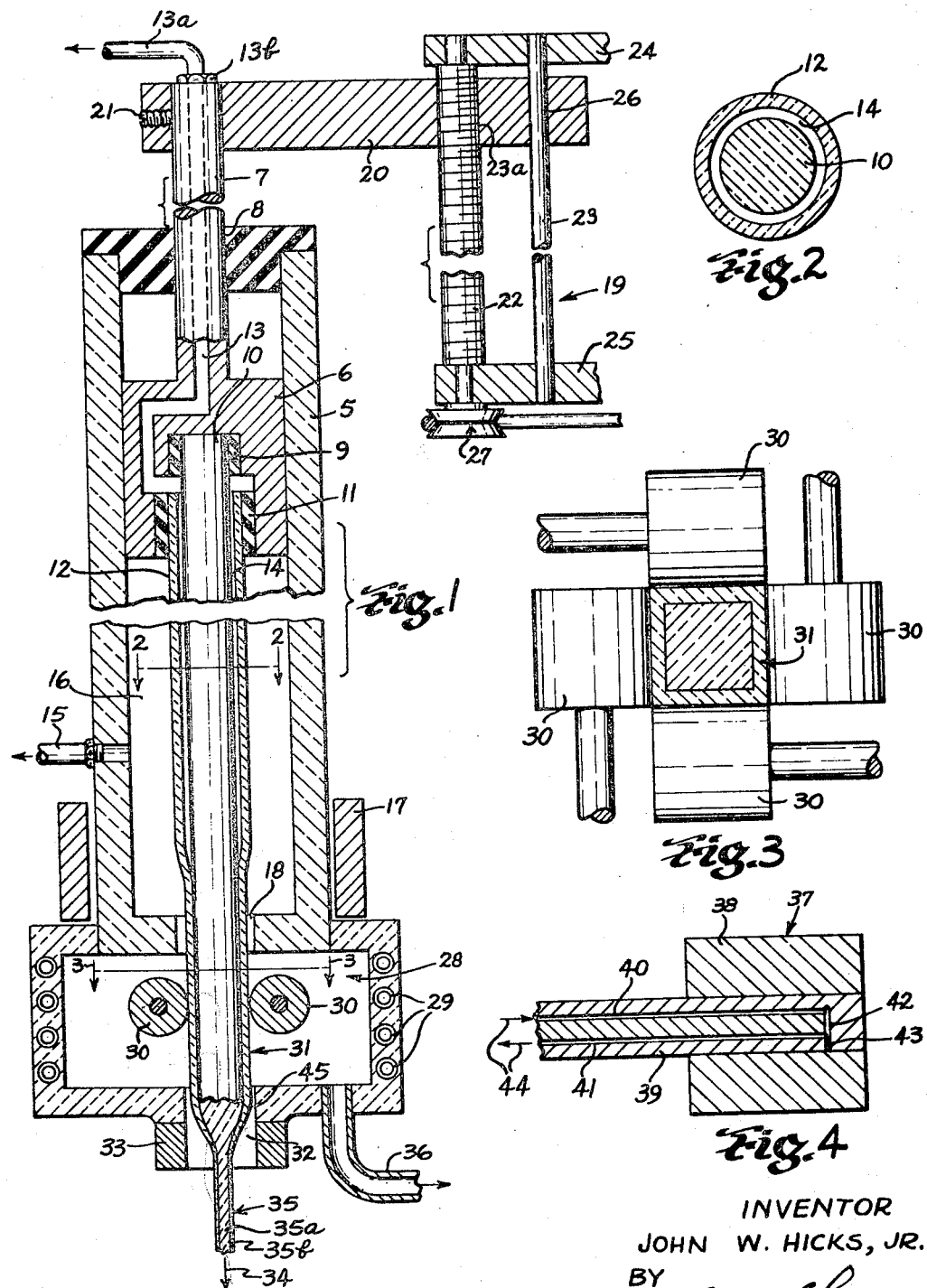
INVENTOR
JOHN W. HICKS, JR.
BY
Louis L. Gagnon
ATTORNEY

United States Patent Office 2,980,957
Patented Apr. 25, 1961

2,980,957

METHOD AND APPARATUS FOR USE IN THE FABRICATION OF LIGHT-CONDUCTING DEVICES

John W. Hicks, Jr., Fiskdale, Mass., assignor to American Optical Company, Southbridge, Mass., a voluntary association Filed Aug. 11, 1958, Ser. No. 754,255

6 Claims. (Cl. 18—8)

This invention relates to an improved method of manufacture of light-conducting fibers or filaments of glass or other similar heat-softenable light-conducting material having a relatively high index of refraction and having an outer layer or casing of glass or other similar heat-softenable material of a relatively low index of refraction thereon and has particular reference to novel apparatus for carrying out said method.

One of the principal objects of the invention is to provide novel method and apparatus for forming light-conducting fibers or filaments of the above character comprising initially forming a rod of glass having a relatively low index of refraction or other heat-softenable material, supporting said rod internally of said tube, subjecting said assembled tube and rod to heat of an amount sufficient to soften the glass or other material of said tube and simultaneously causing said tube to collapse into intimate fused relation with said rod.

Another object is to provide, in a method of the above character, the step of moving said rod and tube assembly at a controlled rate of speed through a heating unit and for simultaneously creating a relatively high vacuum to be drawn between said rod and tube for causing the tube, as it is heated by said heating unit, to progressively collapse into intimate contact and into fused relation with the rod and for simultaneously outgasing and preventing any pocketing of air, gases or the like between said tube and rod.

Another object is to provide, in a method of the above character, the step of initially shaping the rod to a predetermined cross-sectional shape and thereafter causing said tubular casing to collapse and fuse to said rod and to simultaneously assume the contour shape of the preshaped rod.

Another object is to provide, in a method of the above character, the step of creating a relatively high vacuum between the rod and tube to introduce a drawing force on the tube while simultaneously drawing a vacuum of a controlled lesser amount between the tube and an outer sealed housing whereby the collapsing of said tube by said high vacuum may be regulated in such a manner as to insure outgasing of air or other gases from between the casing and rod during the progressive heating and collapsing of said tube.

Another object is to provide, in a method of the above character wherein the cross-sectional shape of the rod and tube are initially circular in shape when in collapsed fused relation with each other, the step of directing said fused rod and tube assembly into a heating chamber and between shaping rollers in said chamber for altering the cross-sectional shape of said assembly in accordance with the pre-controlled shape characteristics of the rollers, the heat in said chamber being controlled in accordance with the softening characteristics of the glasses of said rod and tube assembly and in accordance with the speed of movement of said assembly through the heating chamber and further controlling the temperature of said shaping rollers and the materials thereof so as to maintain them substantially at the annealing temperature of the glasses to avoid heat shock and breakage of said glasses and to prevent the glasses from sticking to said rollers during said shaping operation.

Another object is to provide, in a method of the above character, a neutral atmosphere in said heating chamber particularly in instances when the shaping rollers are formed of graphite or of a metal coated with graphite to reduce the tendency of said graphite to burn out and to further prevent adhering of the rod and tube assembly to said rollers.

Another object is to provide, in a method of the above character, the further step of heating said rod and tube assembly after said shaping step to a temperature which is such as to permit said assembly to be drawn down to a smaller cross-sectional diameter and to the ultimate cross-sectional size desired.

Other objects and advantages of the invention will become apparent from the following description taken in conjunction with the accompanying drawings in which:

Fig. 1 is a diagrammatic longitudinal side-elevational view of apparatus which may be used in carrying out the method of the invention;

Fig. 2 is an enlarged diagrammatic cross-sectional view taken as on line 2—2 of Fig. 1 through the initial rod and tube assembly.

Fig. 3 is a cross-sectional view taken as on line 3—3 of Fig. 1 diagrammatically illustrating one set of forming rollers for controlling the cross-sectional shape of the fused rod and tube assembly; and Fig. 4 is a diagrammatic cross-sectional view of a modified form of shaping roller which may be used in accordance with the invention.

One of the major problems in forming a coating of a relatively low index of refraction on a high index light-transmitting fiber or filament has been that of producing a coating or cladding of a substantially uniform controlled thickness with respect to the cross-sectional thickness of the ultimate fiber or filament and to prevent the trapping of air, gases or foreign material such as dirt, dust, etc. between said claddings and said fibers or filaments during the fabrication thereof.

The present invention, therefore, has for its primary object the provision of a novel method and apparatus for attaining the above results in a simple and efficient manner and for carrying out the steps of cladding, shaping and the drawing down of the rod and tube assembly to the ultimate cross-sectional shape and size of the fiber or filament desired while avoiding all of the difficulties set forth above.

Referring to the drawings wherein like characters of reference designate like parts throughout the various views, the invention relates in part to apparatus comprising an outer housing 5 preferably of fused quartz or similar high melting transparent material. The housing is in the form of a tubular support in which a suitable holder 6 is slidably mounted. The holder 6 is provided with a plunger 7 extending through a sealed opening 8 in the top of the housing. The holder is provided centrally with a retaining ring 9 of rubber or the like in which one end of a rod of high index core glass 10 is fitted and held and the outer surface of the rod 10 is optically polished and thoroughly cleaned prior to the placing of the same in the housing 5. The holder 6 further comprises a similar ring 11 of rubber or like material in which the upper end of an outer low-index tubular glass member 12 which has been thoroughly cleaned to be free of dirt and dust is positioned and held in substantially concentric spaced relation with the inner core 10. The plunger 7 is provided with an internal passageway 13 communicating with the space 14 between the rod-like member 10 and tubular member 12 and a vacuum line 13a is connected to the plunger 7 with a fitting 13b so as to provide means for producing a relatively high vacuum in the space 14 between the members 10 and 12. There is also provided a vacuum line 15 communicating with the space between the housing 5 and the tubular member 12 whereby the suction pull of the high vacuum which is drawn from the space 14 and on the tubular member 12 may be counteracted by the simultaneous drawing of controlled lower vacuum from the space 16. Adjacent the lower end of the housing 5, there is provided a suitable heating unit 17 in surrounding relation with the housing whereby the said rod 10 and tubular member 12 may be heated by radiation to a temperature sufficient to cause the glasses of the rod and tubular member to become softened to an extent whereby the high vacuum in the space 14 which is of an amount greater than the vacuum in the space 16 will cause the tubular member 12 to collapse in an upward direction thereby causing any air or other gases which might be present between the rod 10 and tubular member 12 to be drawn outwardly by the relatively high vacuum simultaneous to said collapsing and wherein the said tubular member will assume an intimate fused contact with the rod. By providing the relatively high vacuum in the space 14 while simultaneously controlling the rate of collapsing of the tubular member 12 with the low vacuum in the space 16, a substantially perfect interface which is free of air or gas bubbles or the like will result since all air or gases which might form during the heating of the rod and tubular member will be forced upwardly by the upward collapsing of the tubular member 12 and be drawn outwardly of the space 14 by the vacuum in line 13a. Furthermore, by initially thoroughly cleaning the rod 10 and tubular member 12 prior to placing the same in the housing 5, the rod and tubular member will be maintained dirt and dust free by the housing 5 during the fusing operation to further insure a perfectly formed interface between the fused parts of the rod and tubular member. An opening 18 is provided at the lower end of the housing 5 through which the collapsed lower portion of the tubular member 12 and rod 10 assembly is slowly moved in a downward direction simultaneous to said heating and collapsing at a controlled rate by suitable motivating means 19 associated with the plunger 7. The motivating means 19 has been shown, for purposes of illustration, to embody an arm 20 having one of its ends secured by a set screw or the like 21 to the plunger 7 and further having a lead screw 22 and a guide spindle 23 passing through its opposite end. The lead screw 22 is threadedly engaged in the arm 20 at 23a and is journaled at its upper and lower ends in stationary supporting brackets 24 and 25 which are immovably mounted relative to the housing 5 whereas the spindle 23 passes through an opening 26 in the arm 20 which is machined to provide a close sliding fit between the arm 20 and spindle 23. The upper and lower ends of the spindle 23 are press-fitted or otherwise secured in the respective brackets 24 and 25 whereby the spindle 23 will provide means for guiding the arm 20 when the same is raised or lowered by rotation of the lead screw 22. Drive means in the form of a belt and pulley arrangement 27 which is connected to the lower end of the lead screw 22 and to a suitable drive motor or the like, not shown, is provided to rotate the screw 22 and thereby lower the arm 20, plunger 7 and holder 6 assembly to lower the rod 10 and tubular member 12 through the heating zone produced by the ring 17 and the opening 18 in the housing 5 at a rate controlled in accordance with the rate at which the pulley and belt arrangement 27 are driven.

The rate at which the rod 10 and tubular member assembly is lowered through the heating zone produced by the ring 17 and through the opening 18 is controlled in accordance with the particular types of glasses from which the rod 10 and member 12 are constructed and the temperatures which are used in accordance with said glasses to produce a fusion between the joined surfaces of the rod 10 and tubular member 12. More specific examples of types of glasses, temperatures and rates of lowering will be given as this description progresses.

Beneath the housing 5 and in communication with the opening 18, there is provided a second heating zone in the form of a chamber 28 having heating coils or the like 29 and a set of shaping rollers 30 therein by means of which the fused assembly or structure 31 of the rod 10 and tubular member 12 may be shaped to a predetermined desired cross-sectional contour.

The heating chamber 28 is further provided with an opening 32 communicating with a lower ring-like heating element 33 having a hollow bore aligned with the opening 32. The opening 32 and heating ring 33 are aligned relative to the rollers 30 and opening 18 so as to receive the structure 31 after passing through the shaping rollers 30. The heating element 33, which provides a third heating zone through which the structure 31 is passed, is adapted to heat the structure 31 to a fiber drawing viscosity whereby said structure may be drawn in the direction of the arrow 34 at a rate greater than the rate at which the structure 31 is fed through the chamber 28 so as to form a glass clad fiber 35 of a smaller cross-sectional dimension than that of the structure 31.

The term "fiber" as referred to herein is to be interpreted as including all light-conducting elements which are relatively small in cross-sectional dimension as compared to their length regardless of their cross-sectional configurations.

In performing the fusing, shaping and drawing operations discussed briefly hereinabove, the rod 10 and tubular member 12 are selected to be of the desired combination of glasses having high and low indices of refraction, which when ultimately drawn into fiber form, will provide an element or fiber readily adaptable to transfer light through its core part while being provided with a light-insulating coating or cladding to prevent said light or portions thereof from straying outwardly of the fiber. A fiber having a core of flint glass with an index of refraction of 1.69 coated or clad with a soda-lime glass such as is used in laboratory tubing and of a thickness approximately 10% that of the outer diameter of the structure 31 will provide a very desirable and useful structure readily adaptable for many applications of use. The above mentioned glasses will be referred to hereinafter as examples of glasses which may be combined to form light-insulated or clad light-conducting fibers, it being understood that it is well within the scope of this invention to form insulated or clad light-conducting fibers or the like of other desired combinations of glasses or similar heat softenable materials.

Having selected a rod 10 of the type of glass desired for the core part 35a of the fiber 35 to be formed therefrom and a tubular member 12 of a type of glass desired for the cladding 35b of the fiber 35, both of which are properly proportioned in thicknesses to produce the desired thickness of cladding 35b upon the finally formed fiber 35, the rod 10 and tubular member are thoroughly cleaned and supported within the housing 5 as described above. The rod 10 and tubular member 12 are complementary in shape and are illustrated as being circular in cross-section as seen in Fig. 2. However, they may alternately be square, hexagonal, octagonal or of any other desired shape. When properly supported within the housing 5, the heating unit 17 is energized to heat the rod 10 and tubular member 12 to fusable temperatures while the vacuums are pulled in the spaces 14 and 16 and the holder 6 is simultaneously slowly lowered at a speed controlled according to the temperature of heating and the softening characteristics of the glass so as to cause said speed to keep pace with the collapsing and fusing of the tube with the rod.

It is pointed out that to begin the operation just described, it is desirable to seal the lower end of the rod 10 and tube 12 assembly to close off the lower end of the space 14 and thereby permit a vacuum to be immediately drawn in said space at the time the glass reaches fusable temperatures. The lower end of the rod 10 and tube 12 may be sealed by applying flame heat thereto and squeezing the tube firmly against the rod prior to the placing of the rod and tube in the housing 5.

With the rod 10 and tubular member 12 in place as shown in Fig. 1, the lower ends thereof (for the example of glasses given above) should be heated to approximately 1300° F. by the heating unit 17 just prior to the collapsing of the tubular member 12 onto the rod 10 by the vacuum within the space 14. At such a temperature, the glass of the tubular member 12 will fuse immediately to the rod 10 when coming into contact therewith and the vacuum in the space 16 is controlled to hold the glass of the tubular member 12 away from the rod 10 until the proper temperature of the tubular member and rod is reached at which time the viscosity of the tube glass will be such as to cause the tube to collapse, in defiance of the pulling force of the vacuum in the space 16. The rate of descent of the holder 6 is controlled (approximately 1/8 of an inch per minute) to cause the complete collapse of the tube 12 to occur within the heating zone produced by the heating unit 17 whereupon the portion of the tube extending upwardly therefrom will take on a substantially conical shape as it becomes partially collapsed. This conical shape, due to the various degrees of collapse along the length of the tube 12 causes gases or the like which may be present in the space 14 to be forced upwardly or actually squeezed out from between the tube and rod and evacuated by the vacuum line 13a thereby providing a clean interface which is free of trapped air or gas bubbles between the fused surfaces of the rod and tube.

It is pointed out that by forming the housing 5 of a transparent material such as fused quartz, the tubular member 12 may be viewed through the housing whereby a visual check on the collapsing of the member 12 may be had so as to permit an operator to adjust the high and low vacuums in the respective spaces 14 and 16 and thereby control the degree or rate of collapsing of the member 12.

As the fused part of the rod 10 and tube 12 combination, which make up the structure 31, is lowered into the heating chamber 28, its temperature is lowered by a reduced temperature which is maintained in the chamber 28. For a structure 31 which is formed of the above mentioned glasses a temperature of approximately 1100° F. is maintained in the chamber 28. In any case, the temperature within the chamber 28 should be approximately 150° F. above the annealing point of the glasses of the structure 31 so as to avoid a rapid cooling thereof as it leaves the housing 5 and prevent a cracking of the glasses which might occur in relatively large structures of heated glass when thermally shocked.

By reducing the temperature of the structure 31 to approximately 150° F. above the annealing point of the rod 10, said structure 31 will retain its shape without appreciably sagging or otherwise distorting while being of a viscosity suitable for reshaping. Upon passing through the set of rollers 30 (Fig. 3), the structure 31 may be readily reformed or shaped to any desired cross-sectional configuration without destroying the proportionate thicknesses of the core and cladding parts thereof. While in Fig. 3 the shaping rollers 30 are such as to form the structure 31 into a square cross-sectional shape, it is to be understood that various different shapes of rollers may be used for producing other cross-sectional shapes as desired.

In Fig. 3, only one set of shiping rollers 30 has been shown to illustrate the invention, however, in certain cases it may be desirable to pass the structure 31 through more than one set of rollers such as 30. For example, the structure 31 may be passed through a first set of rollers adapted to reform the same to the general cross-sectional shape desired thereof and immediately thereafter passed through a second similarly shaped set of truing rollers adapted to accurately impart the final desired shape to the structure 31. It would be advantageous to use more than one set of rollers in instances where the cross-sectional shape of the part of the structure 31 leaving the housing 5 must be drastically changed prior to being drawn into a fiber 35. Alternatively, the rod 10 which is used to form the core part of the structure 31 may be initially shaped substantially to the cross-sectional shape desired of the fiber 35 whereupon the tubular member 12 will, when collapsed and fused to the rod 10, assume the general shape of the rod 10. This will provide the part of the structure 31 leaving the housing 5 with the general cross-sectional shape desired of the fiber 35 whereupon a single set of rollers 30 may be provided to true up the shape of structure 31 just prior to the drawing of the fiber 35. In any case, whatever shape is finally imparted to the structure 31 just prior to the drawing of the fiber 35 will determine the final cross-sectional shape of the fiber 35 since the fiber 35 will retain the cross-sectional shape of the structure 31 regardless of the extent to which it is drawn. Furthermore, the relative thickness of the core 35a and cladding 35b of the fiber 35 will retain the same proportions as the core and cladding parts of the structure 31.

The rollers 30 which are used for shaping the structure 31 may be formed of graphite, steel with an outer coating of graphite, titanium carbide or other known materials suitable for glass reforming or shaping operations.

When using graphite rollers, caution must be taken to prevent the material of the rollers from burning off in the chamber 28 if the temperature in said chamber is raised above 1100° F. Since certain combinations of glasses used to form the structure 31 may require reforming temperature above 1100° F. it is desirable to provide a neutral or substantially oxygen free atmosphere in the chamber 28 as a precautionary measure to prevent a burning off of the material of the graphite rollers even when reforming the structure 31 at 1100° F.

The neutral atmosphere may consist of nitrogen with a possible trace of oxygen or other known neutral atmospheric gases which are fed into the chamber under a slight pressure by a suitable pipeline 36.

If the rollers 37 are constructed of titanium carbide which is more durable and longer lasting than graphite, means must be provided to prevent such rollers from sticking to the glass of the structure 31. A simple solution to the problem of sticking is to provide means for maintaining the rollers 30 (when formed of titanium carbide) at a temperature substantially equal to the annealing temperatures of the glasses of the structure 31. Since as mentioned above, it is desirable to maintain a temperature within the chamber 28 approximately 150° F. higher than the annealing point of the glasses of the structure 31, the rollers 30 must be continuously cooled. In Fig. 4 there is illustrated a roller 37 having a body part 38 of titanium carbide press-fitted or otherwise secured to a shaft 39 which may be formed of a different material than that of the body part 38. A pair of longitudinally extending channels 40 and 41 are drilled or otherwise formed in the shaft 40 so as to open outwardly of the shaft 40 at its end opposite to the body 38 and to terminate at a location adjacent the end of the shaft 39 which passes through the part 38. A lateral passageway 42 is drilled through a side of the shaft or otherwise formed as illustrated to connect the channels 40 and 41. If drilled as illustrated, the passageway 42 is plugged at 43 so as to provide a U-shaped circulating system through which water or other coolants may be circulated as indicated by arrows 44 to dispel some of the heat produced in the part 38 by the heated atmosphere in the chamber 28 and the engaging glass of the structure 31. By properly controlling the rate of flow of the coolant through the shaft 39 the part 38 may be maintained at a relatively constant desired temperature.

It is pointed out that in cases where extremely high temperatures are required in the chamber 28, ducts or the like may be provided in the the part 38 so as to interconnect with the channels 40 and 41 thereby permitting a flow of the coolant through both the shaft 39 and part 38 to provide a greater area of contact between the parts of the rollers 37 and the coolant. In this manner the glass contacting surfaces of the rollers may be more rapidly cooled.

Following the glass shaping operation wherein the structure 31 is passed between the forming rollers 30, the structure is directed downwardly through an opening 45 in the base of the chamber 28 and through the heating ring 33 which is heated to a temperature such that the glasses of the structure 31 come to a suitable fiber drawing viscosity. For the glasses which were given hereinabove as illustrative of the invention, a temperature of approximately 1800° F. will render the structure 31 suitably viscous for fiber drawing.

The fiber 35 is drawn by gripping the lower end of the structure 31 at the heating ring 33 and pulling the same downwardly at a relatively rapid rate as compared to the rate of lowering of the structure 31 through the opening 45. It is pointed out that the cross-sectional size of the fiber 35 will be dependent upon the difference between the rate at which the structure 31 is lowered and the rate at which the fiber 35 is drawn. For a given rate of lowering, the fiber size may be varied by increasing or decreasing the rate of drawing. Slower drawing rates will produce larger fibers and vice versa. It is also pointed out that by initially accurately forming the structure 31 to a particular desired cross-sectional shape and having properly proportioned core and cladding parts such as, for example, a cladding which is 1/10 as thick as the overall thickness of the structure 31, the resultant fiber 35. When drawn, will accurately assume the cross-sectional shape of the structure 31 and also accurately retain the proportionate thicknesses of its core and cladding parts. That is, regardless of the reduced size to which the fiber 35 is drawn its cladding 35b will always remain substantially 1/10 as thick as the overall dimension of the structure 31.

With the apparatus and method set forth hereinabove combinations of glasses which would ordinarily require annealing when in large sizes, such as the structure 31, may be directly drawn into fibers without annealing in accordance with this invention.

By the practice of this invention a light-insulated or clad light-conducting fiber may be rapidly, accurately and efficiently formed to any desired cross-sectional dimension or shape directly from stock materials and the stock materials (particularly the rod 10 from which the light-conducting portion of the fiber is formed) may be examined for flaws or other defects before being used so as to assure the forming of fibers of an exceptionally high degree of optical quality. Furthermore by selecting a rod 10 and tubular member 12 whose relative thicknesses are uniform throughout their lengths and are directly proportioned in size to the desired cross-sectional dimensions desired of the core and cladding parts of the fiber to be formed therefrom, said fiber will automatically be accurately formed uniformly proportioned throughout its length with the desired relative proportionate thicknesses of core and cladding parts regardless of the extent or size to which the fiber is drawn or the shape to which it is formed.

From the foregoing, it will be seen that simple, efficient and economical means and method have been provided for accomplishing all the objects and advantages of the invention. Nevertheless, it should be apparent that many changes in the details of construction, arrangement of parts or steps in the method may be made by those skilled in the art without departing from the spirit of the invention as expressed in the accompanying claims and the invention is not to be limited to the exact matters shown and described as only the preferred matters have been given by way of illustration.

Having described my invention, I claim:

1. The method of making a light-conducting fiber comprising supporting a rod-like member of heat-softenable light-conducting material and a larger tubular member of heat-softenable light-conducting material within an enclosure, said rod-like member being placed centrally within and substantially equally spaced from the inner side walls of said tubular member, passing said supported members endwise through a first heating zone at a rate controlled to cause the portion of said members within said first heating zone to reach fusible temperatures and said portion of said tubular member to become readily collapsible, creating a controlled relatively high vacuum in said space between said members to introduce a drawing force on said tubular member and further creating a controlled relatively low vacuum in said enclosure to controllably partially counteract said drawing force and cause said tubular member to be progressively collapsed into fused relation with said rod-like member so as to outgas said space between said members immediately prior to the fusion of said tubular member to said rod-like member while passing through said first heating zone thereby forming an integral structure of said tubular and rod-like members which is free of pocketed gases, passing said structure through a second heating zone and simultaneously shaping the same to a desired cross-sectional shape, further passing said shaped structure through a third heating zone adapted to heat said shaped structure to a fiber-drawing viscosity and drawing said structure to a fiber size.

2. Apparatus of the character described comprising a housing, a plunger slidably fitted within said housing, means for moving said plunger longitudinally within said housing, holding means on said plunger for supporting a tubular member of heat-softenable material longitudinally within said housing and for simultaneously supporting a smaller rod-like member of heat-softenable material centrally within said tubular member, means for creating a vacuum between said rod and tubular members, heating means surrounding the sides of said housing adjacent one of its ends, said heating means being adapted to heat said rod and tubular members to fusible temperatures, said housing having an opening in its end adjacent said heating means through which said rod and tubular members may be passed, a heating chamber communicating with said opening in said housing for receiving said members and for temperature-conditioning the same to suitable re-shaping temperatures, shaping means adapted to shape said members when passed therebetween and means for heating said shaped members to a fiber-drawing viscosity.

3. Apparatus of the character described comprising a housing having an opening at one end thereof, holding means for supporting a tubular member of heat-softenable material longitudinally within said housing and for simultaneously supporting a smaller rod-like member of heat-softenable material centrally within said tubular member with its side surfaces substantially equally spaced from the inner side walls of said tubular member, means for creating a relatively high vacuum between said rod and tubular members and for creating a relatively low vacuum between said housing and tubular member, heating means adapted to heat said rod and tubular members to fusible temperatures while in said housing, means for progressively moving said rod and tubular members endwise outwardly of said housing through said opening therein, temperature-conditioning means adapted to receive said members from said housing and condition the same for re-shaping, shaping rollers within said temperature-conditioning means having precontrolled shape characteristics adapted to receive said rod and tubular members from said temperature-conditioning means and shape the same in accordance with the shape characteristics of said rollers and heating means into which said members are passed from said rollers and heated to a fiber-drawing viscosity.

4. Apparatus of the character described comprising a housing having a support mounted for longitudinal movement therein, means on said support for holding a tubular member of heat-softenable material and a smaller rod-like member of heat-softenable material substantially in axial alignment with each other within said tubular member, means for moving said support and said members longitudinally in said housing, means for creating a relatively high vacuum between said tubular member and rod-like member and a relatively low vacuum between said tubular members and housing and means for heating said tubular member and rod-like member to a temperature sufficient to fuse said members together upon contact with each other and permit said relatively high vacuum under control of said relatively low vacuum to collapse the tubular member into intimate contact with the rod-like member.

5. The method of making a light-conducting device comprising supporting an initially solid rodlike member of heat softenable light-conducting material endwise substantially centrally within the inner side walls of an initially continuous relatively thin solid walled tubular member of heat softenable light conducting material and in vertically aligned relation with the heating zone of a heating unit, continually drawing a vacuum of a controlled amount within said tubular member while progressively moving said tubular member and said heating unit relative to each other in a direction longitudinally of said tubular member from adjacent the lower end of the tubular member towards its opposite end and to simultaneously remove air or other gases and the like from within said tubular member, controlling the temperature in said heating zone and said related progressive movement so as to cause said assembled rodlike member and tubular member to be progressively heated throughout the major portion of the length thereof by an amount sufficient to permit said tubular member to progressively collapse in response to the pull of the vacuum and to intimately fuse onto said rodlike member as said progressive movement and heating takes place and simultaneously drawing said fused members endwise to a desired reduced cross-sectional size.

6. The method of making a light-conducting device comprising supporting an initially solid rodlike member of glass having a relatively high index of refraction centrally within and substantially equally spaced from the inner side walls of a larger initially solid relatively thin walled tubular member of glass having a relatively low index of refraction continually drawing a vacuum within said tubular member while simultaneously progressively moving said supported members endwise at a precontrolled rate through a first heated zone, controlling the heat produced within said zone in such manner as to render the portion of said tubular member collapsible onto said rodlike member under the influence of said vacuum and simultaneously fusible to said rodlike member upon engagement therewith to form an integral structure of said members as they pass through said first heated zone, directing said structure through a second heating zone, controlling the heat in said second zone to bring the glasses of said structure to a temperature below that required for said fusion thereof but sufficient to retain said structure in a softened reshapable state, shaping said structure to a desired cross-sectional configuration while in said second heating zone, directing said shaped structure through a third heating zone, controlling the heat in said third heating zone in such manner as to render the glasses of said shaped structure suitably viscous for drawing and drawing said structure endwise to a reduced cross-sectional size.

References Cited in the file of this patent

UNITED STATES PATENTS

| | | |
|---|---|---|
| 1,565,307 | Blair | Dec. 15, 1925 |
| 1,663,628 | Ferngren | Mar. 27, 1938 |
| 2,313,296 | Lamesch | Mar. 9, 1943 |
| 2,471,752 | Ingmanson | May 31, 1949 |
| 2,502,312 | Danner | Mar. 28, 1950 |
| 2,780,889 | Fulk | Feb. 12, 1957 |
| 2,825,260 | O'Brien | Mar. 4, 1958 |

FOREIGN PATENTS

| | | |
|---|---|---|
| 496,838 | Italy | Aug. 11, 1954 |
| 520,564 | Italy | Mar. 22, 1955 |
| 239,719 | Switzerland | Feb. 18, 1958 |

UNITED STATES PATENT OFFICE
CERTIFICATE OF CORRECTION

Patent No. 2,980,957 April 25, 1961

John W. Hicks, Jr.

It is hereby certified that error appears in the above numbered patent requiring correction and that the said Letters Patent should read as corrected below.

Column 1, line 26, after "relatively" insert -- high index of refraction or other similar heat-softenable light-conducting material, forming a tubular member of glass having a relatively --.

Signed and sealed this 29th day of August 1967.

(SEAL)
Attest:

ERNEST W. SWIDER
Attesting Officer

EDWARD J. BRENNER
Commissioner of Patents